United States Patent [19]

Stansfield

[11] Patent Number: 4,626,859
[45] Date of Patent: Dec. 2, 1986

[54] DIRECTION FINDING SYSTEMS

[75] Inventor: Edward V. Stansfield, Reading, England

[73] Assignee: Racal Research Limited, Berkshire, England

[21] Appl. No.: 655,637

[22] Filed: Sep. 28, 1984

[30] Foreign Application Priority Data

Oct. 7, 1983 [GB] United Kingdom ............... 8326912

[51] Int. Cl.$^4$ .............................................. G01S 5/04
[52] U.S. Cl. ................................... 342/442; 342/444; 342/445
[58] Field of Search ............... 343/423, 442, 444, 445, 343/5 SA, 5 DP, 5 FT, 394, 465

[56] References Cited

U.S. PATENT DOCUMENTS

| 3,792,472 | 12/1974 | Payne et al. |
| 3,887,923 | 3/1975 | Hendrix. |
| 3,973,262 | 3/1976 | Bohm. |
| 4,333,170 | 1/1982 | Mathews. |

FOREIGN PATENT DOCUMENTS

| 2130563 | 3/1972 | France. |
| 2385105 | 3/1978 | France. |
| 2482311 | 5/1981 | France. |
| 1198424 | 8/1965 | Fed. Rep. of Germany. |
| 2242790 | 3/1974 | Fed. Rep. of Germany. |
| 1144361 | 3/1969 | United Kingdom. |
| 1372934 | 11/1974 | United Kingdom. |
| 1392343 | 4/1975 | United Kingdom. |
| 1395599 | 5/1975 | United Kingdom. |
| 1395877 | 5/1975 | United Kingdom. |
| 1475414 | 6/1977 | United Kingdom. |
| 1536996 | 12/1978 | United Kingdom. |
| 1551526 | 8/1979 | United Kingdom. |
| 1560681 | 2/1980 | United Kingdom. |
| 2064257 | 6/1981 | United Kingdom. |
| 1598325 | 9/1981 | United Kingdom. |
| 2076152 | 11/1981 | United Kingdom. |
| 1593286 | 7/1981 | United Kingdom. |
| 2095497 | 9/1982 | United Kingdom. |
| 2101440 | 1/1983 | United Kingdom. |

Primary Examiner—Theodore M. Blum
Assistant Examiner—David Cain
Attorney, Agent, or Firm—Leydig, Voit & Mayer

[57] ABSTRACT

A DF system using a circular array of three to eight antennas, analyses the received signals digitally by first calculating at (8) the Fourier transform of the received signals to obtain frequency information and deriving at (10) from the Fourier transform the relative phases of the received signals at each of a number of spaced sample frequencies. This phase information is then fed to a stage (12) which takes the spatial Fourier series of the phases from which the required bearing information is derived as $\pi/2$ minus the arctan of the ratio of the real and imaginary parts of the Fourier series taken to suitable moduli. For a four antenna array the diameter of the circular array is constrained to be less than half of the wavelength at the highest frequency of interest. For a three antenna array, the diameter is constrained to be less than one third the wavelength at the highest frequency of interest in order that the analysis should yield accurate and unambiguous bearing outputs.

5 Claims, 1 Drawing Figure

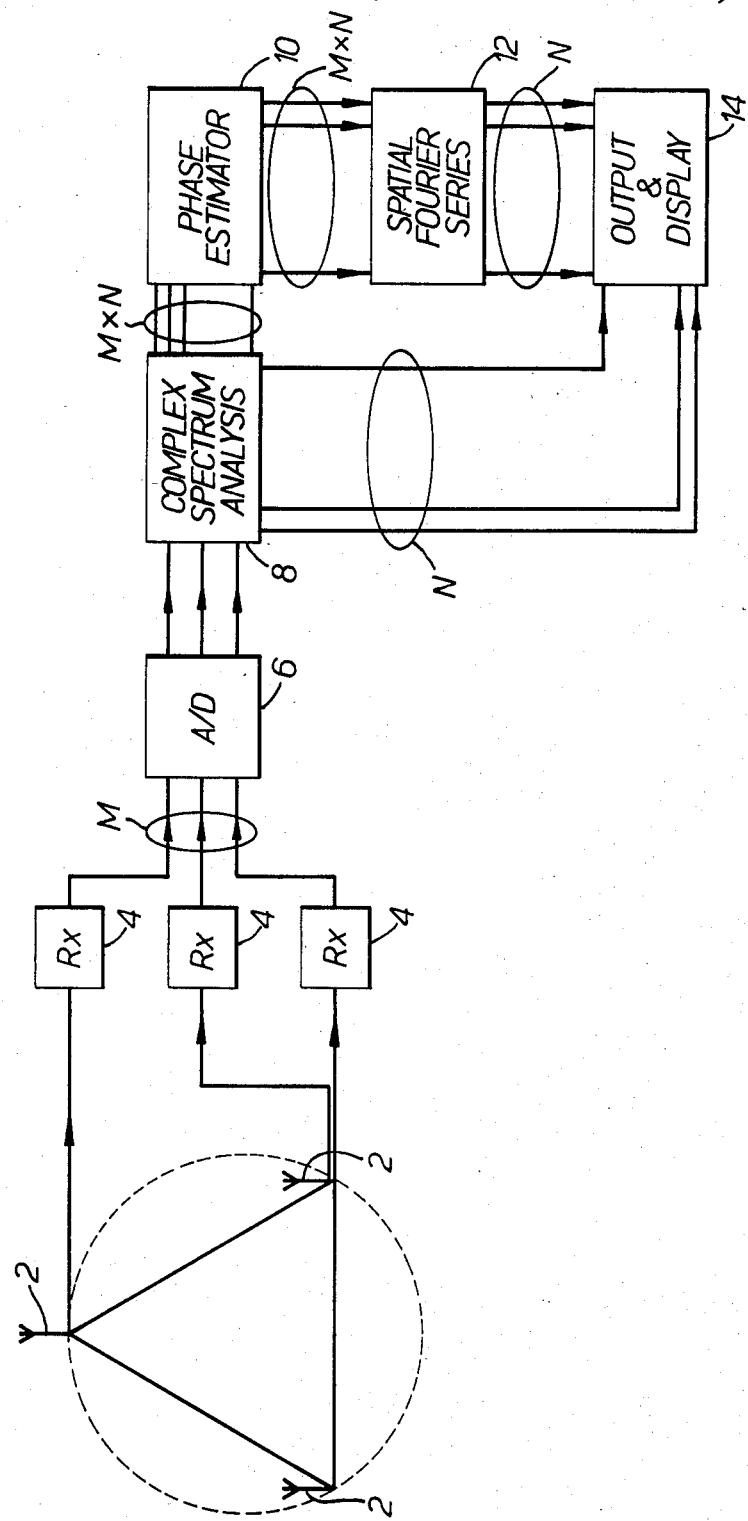

DIRECTION FINDING SYSTEMS

BACKGROUND OF THE INVENTION

1. Technical Field

The present invention relates to direction finding (DF) systems and more specifically, to DF systems using circular antenna arrays.

2. Prior Art

Most presently used techniques for analysing received signals from circular arrays of antennas equally spaced around an imaginary circle are based on either the spatial Fourier series method or the Butler matrix method. The Butler matrix method is described in a paper by J. Butler and R. Lowe entitled "Beam Forming Matrix Simplifies Design of Electronically Scanned Antennas" in Electronic Design, Apr. 12, 1961, Pages 170–173. The limitations of these techniques are described in a paper entitled "Studies of the Adcock Direction Finder in terms of Phase-mode Excitations Around a Circular Array" by Guy et al in "The Radio and Electronic Engineer Vol.53, No.1, pp33–38, January 1983.

Practical implementations of these techniques are described, by way of example, in GB-A-1593286 and GB-A-2095497.

Both these methods employ a number of approximations in their analysis which limit their accuracy and it would therefore be desirable to provide a method of analysis suitable for implementation with a circular antenna array that disposed of all analytical approximations and provided a potentially output of the bearing of a received signal.

In most typical electromagnetic environments in which DF systems are currently used, there are many signals being received by the antennas. Unless the receivers used are to be tuned to a particular frequency, it is essential that the DF system should be capable of accurately indicating the presence of and discriminating between the bearing directions of a large number of signals of different frequencies covering the whole of a received wide bandwidth.

U.K. Patent Application No. 2076152A (Krupps) shows a direction finding system using a 4 antenna Adcock array which is adapted to be frequency selective. The signals received by each antenna are fed to a Fast Fourier Transform (FFT) processing block which outputs a spectrum of the received signal. Cross spectra of the signals received from opposite antennas are produced and, from these, a bearing calculation is performed and an output display representing the incident angles of signals relative to their frequency is generated. The bearing angles themselves are calculated as the arctan of a ratio of transit times determined from phase differences. There is no discussion of the limitations on the size of the array in order to produce accurate bearing outputs. The bearing calculation technique employed depends on having cross spectra from orthogonal apertures and is limited to the case of 3 antennas arranged at the corners of a right angled isosceles triangle or 4 antennas at the corners of a square. The processing method described is relatively elaborate. Moreover when the number of antennas is reduced from 4 to 3, the antenna system will be asymmetric and therefore an imbalance in the electromagnetic mutual coupling between the elements will be produced. This will give rise to phase measurement errors.

The technique of providing frequency selectivity in direction finding systems has been described in British Patent Specification No. 1392343. This specification discloses the use of orthogonal transformations including the Fast Fourier Transform for generating spectra from received antenna signals in direction finding systems. This specification does not discuss in detail appropriate methods for analysing the spectra to produce the required bearing information.

SUMMARY OF THE INVENTION

The DF system of the present invention attempts to solve the technical problem of providing an accurate method of analysing the signals received by the antennas of a circular array in order to distinguish the bearing of one or more received signals in a band.

The present invention provides a direction finding system responsive to a band of frequencies including at least three antennas disposed so as to define an array of antennas equally spaced about the periphery of a circle having a diameter less than a proportion of the wavelength of the highest frequency of said band, a respective wideband receiver connected to each said antenna and adapted to produce a digital output representative of the signal received by said antenna, means for deriving from said digital output a signal in digital form representing the spectrum of said received signal, means for deriving from said signal spectrum of each said received signal the phases of any signal received by the antennas at each of a plurality of sample frequencies relative to a virtual reference, and means for calculating for each said sample frequency a spatial Fourier series, as defined herein, of said phases, and deriving therefrom the bearing of any source transmitting at each said sample frequency.

The above defined system is advantageous in that it embodies a processing technique which is applicable to any equally spaced circular array of antennas irrespective of the number of antennas. In the cases of three or four antennas, with suitable constraints, a completely unambiguous output bearing can be produced.

BRIEF DESCRIPTION OF THE DRAWING

The FIGURE is a diagrammatic representation of a direction finding receiver system.

DESCRIPTION OF PREFERRED EMBODIMENTS

A DF receiver includes a circular array of three to eight antennas 2 equally spaced on the circumference of an imaginary circle. In the illustrated embodiment, three antennas are arranged at the apices of an equilateral triangle. The diameter of the imaginary circle is in this case selected to be less than one third of a wavelength at the highest frequency of interest as will be shown later. The DF system could also be embodied with larger circular arrays including 6 or 8 antennas with suitable limitations on the array diameter. In the following discussion the number of antennas will be taken as M where M may be any number from three to eight although for some values of M approximations and ambiguous bearing value outputs may need to be tolerated.

The signal received at each antenna 2 is received by a corresponding receiver 4 and the voltage of each received signal is sampled and converted into digital form by an A-D converter 6. The digitised samples are then fed into a complex spectrum analysis stage 8. This stage 8 is preferably a suitably programmed microprocessor which may also perform some of the other analytical functions discussed below.

The complex spectrum analysis stage 8 performs Fourier transformations of the received antenna signals. This allows the system to be frequency selective so that different sources radiating at different frequencies can be identified. For a single received frequency ($\omega_o$), the received signal $e(m,t)$ at the mth antenna where m has values from 0 to M−1 for an M dimensional antenna array is given by the following:

$$e(m,t) = a \cdot \cos[\omega_o(t-T) + R \cdot \sin(d + 2\pi m/M)] \quad (1)$$

where
a = amplitude of received signal
$\omega_o$ = angular frequency of received signal
t = time
T = time reference of radio source
R = $r\omega_o/c$
r = radius of array
c = velocity of propagation
d = $(\pi/2) - b$
b = bearing angle.

The Fourier transform of the mth antenna signal is given by:

$$E(m,\omega) = \int_{-\infty}^{+\infty} e(m,t)\exp(-j\omega t)dt = \quad (2)$$

$$0.5a \left\{ \begin{array}{l} \exp\{j[-\omega_o T + R\sin(d + 2\pi m/M)]\}\delta(\omega - \omega_o) \\ +\exp\{-j[-\omega_o T + R\sin(d + 2\pi m/M]\}\delta(\omega + \omega_o) \end{array} \right\}$$

where
$\delta(\omega)$ is the Dirac impulse function and
$\omega = 2\pi f$ is angular frequency.

The complex spectrum analysis stage 8 performs this Fourier transform on the digital samples representing each antenna signal and as it is not possible to integrate these samples over all times a suitable window such as a Hanning window of raised cosine form is applied to the digital samples in accordance with a well-known technique. The Fourier transform may be carried out by the microprocessor using a discrete Fourier transform algorithm. A fast Fourier transform could be used. The windowing and sampling employed will necessarily introduce some degree of approximation to the actual implementation of the analysis. However the errors due to this approximation are relatively small and, for the purposes of explaining the analysis employed in the present system it will be assumed that continuous functions are generated although the entire processing is carried out digitally with sampled signals. It will be appreciated that the use of continuous signals for explanation of the analysis considerably simplifies the notation.

Equation (2) assumes only one frequency $\omega_o$ is present but normally there will be several discrete signals at different frequencies. Therefore $E(m,\omega)$ is calculated as a series of digital samples for each of N, for example, 32, equally spaced sample frequencies.

Therefore the output from the complex spectrum analysis stage consists of M×N parallel lines. A line is provided for each antenna and each different sample frequency. On each line a series of digital samples representing the Fourier transform $E(m,\omega)$ are output. Each line may itself be a set of parallel lines, so that each line of the set carries one bit of each digital sample.

This Fourier transform information is fed to a phase estimator 10. The phase estimator 10 derives the relative phases $\phi(m,\omega)$ of the received signal for each of the M antenna elements and each sample frequency. The phase is obtained by taking the four quadrant inverse tangent of the ratio of the imaginary and real components of $E(m,\omega)$ at positive frequencies. For the single received frequency $\omega_o$ being considered this yields:

$$\phi(m,\omega_o) = -\omega_o T + R\sin(d + 2\pi m/M) + 2\pi q(m) \quad (3)$$

where $q(m)$ is an unknown integer such that $|\phi(m,\omega_o)| \leq \pi$ It should be noted that the phase estimated in this way is in effect the phase of the antenna signal $e(m,t)$ with respect to a virtual reference signal $\cos(\omega_o t)$. The $2\pi q(m)$ term arises because a reference signal $\cos(\omega_o t)$ is indistinguishable from a reference signal $\cos(\omega_o t - 2\pi q(m))$.

The phase $\phi(m,\omega)$ is calculated for each of the N different sample frequencies. When no signal is present at or close to a particular sample frequency the result is spurious, but it will be shown that such results can be eliminated in the final processing stage to discriminate between frequencies at which a signal is present and those results which are spurious. Naturally, by selecting N equally spaced frequencies covering the desired band to be monitored, the actual signals may fall between two sample frequencies and accordingly optimal results will not be obtained for signals at those frequencies.

The output of the phase estimator stage 10 is a phase value for each of the N different sample frequencies for each of the M antennas of the array. These signals are fed to a spatial Fourier series stage 12, which derives the spatial Fourier series $\rho(\omega)$ of the phases $$\rho(\omega) = \sum_{m=0}^{M-1} \phi(m,\omega)\exp(j2\pi m/M) \quad (4)$$

Substituting for $\phi(m,\omega)$ from equation (3) produces the following for the single received frequency $\omega_o$ being considered:

$$\rho(\omega_o) = \left\{ \begin{array}{l} -\omega_o T \sum_{m=0}^{M-1} \exp(2j\pi m/M) \\ +R \sum_{m=0}^{M-1} \sin(d + 2\pi m/M)\exp(2j\pi m/M) \\ +2\pi \sum_{m=0}^{M-1} q(m)\exp(2j\pi m/M) \end{array} \right. \quad (5)$$

Using the results set out in the annex to this specification it can be shown that the first term of this equation is 0 if M>1. When the sine factor in the second term is represented in complex exponential form, the second term can be written as:

$$(R/2j) \sum_{m=0}^{M-1} [\exp(jd)\exp(j2\pi m/M) - \exp(-jd)] \quad (6)$$

Again by the result given in the annex, the first component of this second term is 0 if M>2. The spatial Fourier series of the phase is thus simplified to:

$$p(\omega_o) = j(RM/2)\exp(-jd) + 2\pi \sum_{m=0}^{M-1} q(m)\exp(j2\pi m/M) \quad (7)$$

The second term of this equation can be eliminated by constraints on the array diameter as shown below.

For the illustrated case of three antennas, the three possible values of $\exp(j2\pi m/M)$ are $1, (-1+j\sqrt{3})/2$ and $(-1-j\sqrt{3})/2$. From equation (7), therefore, as $RM/2 = 1.5R$ and $\exp(-jd) = -j\sin(d) + \cos(d)$, the spatial Fourier series of the phases can be written out as:

$$(\omega_o) = 1.5R \sin(d) + \pi[2q(0) - q(1) - q(2)] +$$

$$j\{1.5R \cos(d) + \sqrt{3} \pi[q(1) - q(2)]\}$$

With $1.5R$ constrained to be less than $\pi/2$ it can be seen that:

Real $[p(\omega_o)]$ modulo $\pi = 1.5R \sin(d)$, and

Imaginary $[p(\omega_o)]$ modulo $\sqrt{3} \pi = 1.5R \cos(d)$.

The modulo $\pi$ operation is defined such that the result is in the range $-\pi/2$ to $+\pi/2$ and similarly for the modulo $\sqrt{3}\pi$ operation. Therefore the modulo $\pi$ and $\sqrt{3}\pi$ operations effectively eliminate terms including the $g(m)$ terms. The four quadrant inverse tangent of the ratio of the real and imaginary parts taken to modulo $\pi$ and modulo $\sqrt{3}\pi$ respectively yields an accurate, unique and unambiguous estimate of the bearing information d. The restriction that $R < \pi/3$ where $R = r\omega_o/c$ is equivalent to constraining the array diameter $2r$ to be less than one third of a wavelength at the highest frequency of interest. The actual bearing of the signal source at $\omega_o$ is calculated from $b = (\pi/2) - d$.

For an array of four antennas the four possible values of $\exp(j2\pi m/M)$ are $1, j, -1$ and $-j$, consequently the imaginary component of the second term in equation (7) can only have values which are integer multiples of $2\pi$ including 0. Now, if the value of $RM/2 = 2R$ is constrained to be less than $\pi$, then taking the real and imaginary parts of $p(\omega_o)$ modulo $2\pi$ will in effect eliminate the $g(m)$ dependent terms and yield a unique and unambiguous bearing estimate. Therefore equation (7) becomes:

$$p(\omega_o) = 2R \sin(d) + 2\pi[q(0) - q(2)] + j\{2R \cos(d) + 2\pi[q(1) - q(2)]\}$$

With $2R$ constrained to be less than $\pi$, the real part of $p(\omega_o)$ modulo $2\pi = 2R \sin(d)$ and the imaginary part of $p(\omega_o)$ modulo $2\pi = 2R \cos(d)$, so that a four quadrant inverse tangent operation on the ratio of the real and imaginary parts then yields the wanted bearing information d from which the bearing b is derived as $b = (\pi/2) - d$. The constraint $R < \pi/2$ implies that the array diameter $(2r)$ must be less than half a wavelength at the highest frequency of interest.

Reviewing the above, in the illustrated embodiment with $M = 3$, the spatial Fourier series stage 12 takes the Fourier series of the phases for each of the N sample frequencies and then computes the arctan of the ratio of the real and imaginary parts of the Fourier series modulo $\pi$ and $\sqrt{3}\pi$ respectively and outputs the estimated bearing as $\pi/2$ minus the calculated arctan.

This bearing information output from the spatial Fourier series stage 12 and amplitude information derived by taking the magnitude of $E(m,\omega)$ at the complex spectrum analysis stage 8 for each sample frequency are then fed to a final output and display stage 14. This final stage 14 analyses the results obtained for the N sample frequencies to determine at which frequency signals are being received. For example, by outputting the bearing information b calculated for amplitudes of over a predetermined threshold value. However, when a received signal has a frequency intermediate between two of the sample frequencies, the calculated bearing for each of the adjacent sample frequencies will be substantially identical but the amplitudes will be reduced, in the worst case to half the true amplitude. Therefore, it may be necessary to introduce more complex criteria for selecting which bearing information to display together with an estimate of the frequency of the source at that bearing. The complexity of the analysis carried out at the final output stage depends upon the application to which the system is to be put. In its simplest form, the output stage 14 can display frequency, bearing and amplitude for each of the N sample frequencies, so that the operator can himself determine the likelihood of signals at or close to these sample frequencies.

With suitable limitations on the array diameter, the present analysis can also be employed for circular arrays of five to eight antennas. However, in each case the array is constrained to be of smaller diameter than the cases for either three or four antennas and is therefore more liable to errors as the phases of the signals will be relatively closer.

With the use of arrays of larger diameter than the limits set out above, it is also possible to use the above-described system. However, because of the $q(m)$ term the output will include ambiguous bearings as well as the correct values. In certain circumstances these ambiguous bearings can be eliminated from the results for example, if the possible range of bearing values is known within limits.

The present DF system could also be used in narrow and wide aperture form, where a narrow aperture system is one which has an array diameter falling within the required constraints for an accurate and unambiguous bearing output. The bearing information from the narrow aperture system can then be used to eliminate ambiguous bearing values from the output of the wide aperture system to produce bearing outputs which are less sensitive to reception errors.

ANNEX

It is desired to show that $$s = \sum_{m=0}^{M-1} \exp[\pm j2\pi mp/M] = M \sum_q \delta(p - qM) \quad (AI)$$

For $p = qM$ the left hand side is:

$$s = \sum_{m=0}^{M-1} \exp[\pm j2\pi qm] = M$$

For $p \neq qM$, let $x = \exp(\pm j2\pi p/M)$. Then:

$$s = \sum_{m=0}^{M-1} x^m = (1 - x^M)/(1 - x)$$

Since $x^M = 1$, this means that $s = 0$ when $p \neq qM$.
Hence it has been shown the equation A1 is true.

I claim:

1. A direction finding system responsive to a band of frequencies including
   at least three antennas disposed so as to define an array of antennas equally spaced about the periphery of a circle having a diameter less than a proportion of half the wavelength of the highest frequency of said band,
   a respective wideband receiver connected to each said antenna and adapted to produce a digital output representative of the signal received by said antenna,
   means for deriving from said digital output a signal in digital form representing the spectrum of said received signal,
   means for deriving from said signal spectrum of each said received signal the phase ($\phi(m,\omega)$) of any signal received by the antennas at each of a plurality of sample frequencies ($\omega$) relative to a virtual reference, and
   means for calculating for each said sample frequency ($\omega$) a spatial Fourier series ($\rho(\omega)$) of said phases, where $$\rho(\omega) = \sum_{m=0}^{M-1} \phi(m,\omega)\exp(j2\pi m/M)$$

in which M is the number of antennas in said array, and m is an index which takes the values 0 to M-1 to represent each said antenna in turn, and deriving from said spatial Fourier series the bearing of any source transmitting at each said sample frequency.

2. A system according to claim 1, including four antennas and in which said means for deriving the bearing of any source at each said sample frequency comprises means for calculating $\pi/2$ minus the arctan of the ratio of the real and imaginary parts of said spartial Fourier series taken to modulo $2\pi$.

3. A system according to claim 1, including three antennas, and in which said means for deriving the bearing of any source at each sample frequency comprises means for calculating $\pi/2$ minus the arctan of the ratio of the real part of said spatial Fourier series taken to modulo $\pi$ and the imaginary part taken to modulo $\sqrt{3}\pi$, and the array diameter is less than a third of the shortest wavelength of the band.

4. A system according to claim 1, in which the spectrum deriving means comprises means for performing a temporal Fourier transform on said digital output from the said receiver means, and said phase deriving means derives the arctan of the ratio of the real and imaginary parts of the Fourier transform taken to a suitable modulus.

5. A method of processing the signals received in a wideband, narrow aperture direction finding system by each antenna of a uniform circular array of antennas, comprising the steps of receiving and digitising the signal received by each antenna,
   performing a discrete Fourier Transform on each received signal,
   taking for each of a plurality of sample frequencies ($\omega$) the arctan of the real and imaginary parts of the Fourier transform to provide the relative phase ($\phi(m,\omega)$) of any signal received by each antenna at each frequency ($\omega$),
   taking the spatial Fourier series ($\rho(\omega)$) of the relative phases at each sample frequency, where $$\rho(\omega) = \sum_{m=0}^{M-1} \phi(m,\omega)\exp(j2\pi m/M)$$

in which M is the number of antennas in said array, and m is an index which takes the values 0 to M-1 to represent each said antenna in turn, and
   producing the bearing of any received signal as $\pi/2$ minus the arctan of the real and imaginary parts taken to a suitable modulus of said spatial Fourier series for each sample frequency.

* * * * *